United States Patent [19]
Sato et al.

[11] Patent Number: 5,398,293
[45] Date of Patent: Mar. 14, 1995

[54] SYSTEM FOR EDITING IMAGE DATA

[75] Inventors: Takeshi Sato, Tokyo; Tsutomu Okuno, Sapporo, both of Japan

[73] Assignee: Mutoh Industries, Ltd., Tokyo, Japan

[21] Appl. No.: 257,213

[22] Filed: Jun. 7, 1994

Related U.S. Application Data

[63] Continuation of Ser. No. 801,996, Dec. 3, 1991, abandoned.

[30] Foreign Application Priority Data

Dec. 28, 1990 [JP] Japan .................. 3-415789
Nov. 14, 1991 [JP] Japan .................. 3-326490

[51] Int. Cl.⁶ ............................................. G06K 9/00
[52] U.S. Cl. ............................ 382/57; 358/452; 395/146
[58] Field of Search ................. 382/41, 57; 395/146, 395/141, 142, 143, 133, 135; 358/450, 452, 453

[56] References Cited

U.S. PATENT DOCUMENTS

| | | | |
|---|---|---|---|
| 4,881,130 | 11/1989 | Hayashi | 382/57 |
| 5,121,448 | 6/1992 | Katayama et al. | 382/57 |
| 5,150,434 | 9/1992 | Hori et al. | 382/57 |

FOREIGN PATENT DOCUMENTS

| | | |
|---|---|---|
| 61-74079 | 4/1986 | Japan . |
| 61-169968 | 7/1986 | Japan . |
| 63-104190 | 5/1988 | Japan . |

*Primary Examiner*—Leo H. Boudreau
*Attorney, Agent, or Firm*—Lowe, Price, LeBlanc & Becker

[57] ABSTRACT

There is provided a system for editing image data in which addition to and correction of image data constructed by a set of dot data can be effected in an extremely simple operation while attaining the matching between the parameters such as the width of a line, the radius, the inclination, and the size of characters of the added or corrected portion and those of the image data. A connected area included in the image data is stored in a connected area data buffer. When a desired point of the image data is specified, a diagram constituent parameter deriving section extracts a connected area adjacent to the specified point from the connected area data buffer and derives diagram constituent parameters such as the width of a line, the inclination, the radius of a circle, the central point, the size of a character string and the character pitch for the connected area. The parameters can be used when the edition is effected by an edition processing section.

24 Claims, 14 Drawing Sheets

SYSTEM FOR EDITING IMAGE DATA

This application is a continuation of application Ser. No. 07/801,996, filed Dec. 3, 1991, now abandoned.

BACKGROUND OF THE INVENTION

1. Field of the Invention

The present invention relates to an image data editing system for effecting the edition of image data, for example, addition to or correction of image data, and more particularly to a method and apparatus for editing image data suitable for edition of image data represented by a set of dot data such as image data read by an image scanner or another image reader.

2. Description of the Related Art

Recently, an image filing system called an electronic filing system or optical filing system, for example, is used to file a large number of drawings including handwritten drawings as image data. The filing of the drawings makes it easy to manage the drawings, for example, store and retrieve the drawings, and is effective to reduce the space for reserving the drawings.

This type of image filing system files and stores the drawings as image data. The image filing system is not only used to file the drawings but also desired to permit the addition to or correction of the filed drawings, that is, edition of the drawing data when the design is changed.

Generally, in a computer-aided design (CAD) system, in order to simplify the diagram data processing, drawing data constructed by diagram constituents which are defined by character pattern data output from a character generator and vector data is used as drawing data or CAD data. In the conventional CAD system, when patterns such as lines, arcs or characters are added to the drawing data which are already stored in the memory device, diagram constituents defined by output data from the character generator and vector data are additionally provided in the same manner as in a case wherein ordinary CAD data is added. In this case, it is necessary to attain the matching between the width of lines, the curvature of curved lines and the size of characters, for example, of the diagram constituents to be added and those of the diagram constituents already stored.

Image data obtained by reading the handwritten drawing by use of an image scanner, for example, is a set of dot data and does not have data of parameters such as the width of lines, the radius of curvature and the size of characters unlike the ordinary CAD data. Therefore, when a diagram is added to the diagram already drawn by dot data or the diagram is changed in the conventional CAD system and image filing system, the operator is required to effect the editing operation after determining the parameters such as the width of lines, the radius of curvature and the size of characters by trial and error in order to attain the matching between the width of lines, the radius of curvature and the size of characters of the newly added diagram and those of the diagram already drawn by the dot data. The operation of the operator for repeatedly determining the parameters such as the width of lines, the radius of curvature and the size of characters by trial and error is extremely troublesome and the efficiency of the editing operation is extremely low.

SUMMARY OF THE INVENTION

An object of the invention is to provide a method and apparatus for editing image data in which addition to and correction or modification of image data constructed by a set of dot data can be attained in an extremely simple operation while attaining the matching between the parameters such as the width of lines, radius, inclination, and the size of characters of the added or corrected portion and those of the original image data.

A method of editing image data according to the invention is to specify a desired connected area which is formed of connected-dot data and lies in image data represented as a set of dot data and to determine a diagram constituent and diagram constituent parameters corresponding to the image data from the image data of the connected area so as to effect the process of editing the image data by use of the diagram constituent parameters. The "connected-dot data" is the data which represents dots connected each other.

In accordance with another aspect of the invention, the method is to specify a desired connected area which is formed of connected-dot data and lies in image data represented as a set of dot data, specify a diagram constituent corresponding to the connected area and determine diagram constituent parameters corresponding to the specified diagram constituent from the image data of the connected area so as to effect the process of editing the image data by use of the diagram constituent parameters.

An apparatus of editing image data according to further aspect of the invention comprises an area specifying section for specifying a desired connected area which is formed of connected-dot data and lies in image data represented as a set of dot data; a diagram constituent parameter extracting section for deriving a diagram constituent and diagram constituent parameters corresponding to the image data from the image data of the connected area specified by the area specifying section; and an edition processing section for effecting the process of editing the image data by use of the diagram constituent parameters.

In accordance with still another aspect of the invention, the apparatus comprises an area specifying section for specifying a desired connected area which is formed of connected-dot data and lies in image data represented as a set of dot data; a diagram constituent specifying section for specifying a diagram constituent corresponding to the connected area specified by the area specifying section; a diagram constituent parameter extracting section for deriving diagram constituent parameters corresponding to the diagram constituent specified by the diagram constituent specifying section from the image data of the connected area specified by the area specifying section; and an edition processing section for effecting the process of editing the image data by use of the diagram constituent parameters.

According to the method and apparatus of the invention, when a desired connected area in the image data is extracted prior to the editing process, necessary diagram constituent parameters are derived from the image data of the specified connected area. F/r example, when the connected area indicates a straight line, the parameters of the width of the line and vector of the central line thereof are derived. When the connected area indicates a circle, the parameters of the coordinates of the center point of the circle, the radius of the circle and the width of the line are derived. When the connected area indicates characters, the parameters of the inclination of the character, the character pitch and the size of the character are derived. The thus derived diagram constituent parameters are effectively used in the later editing process.

Therefore, it becomes unnecessary to input parameters repeatedly by trial and error when addition to or modification of diagram constituent is effected, and as a result, the editing operation can be extremely simplified.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

There will now be described embodiments of the invention with reference to the accompanying drawings.

Figure 1:
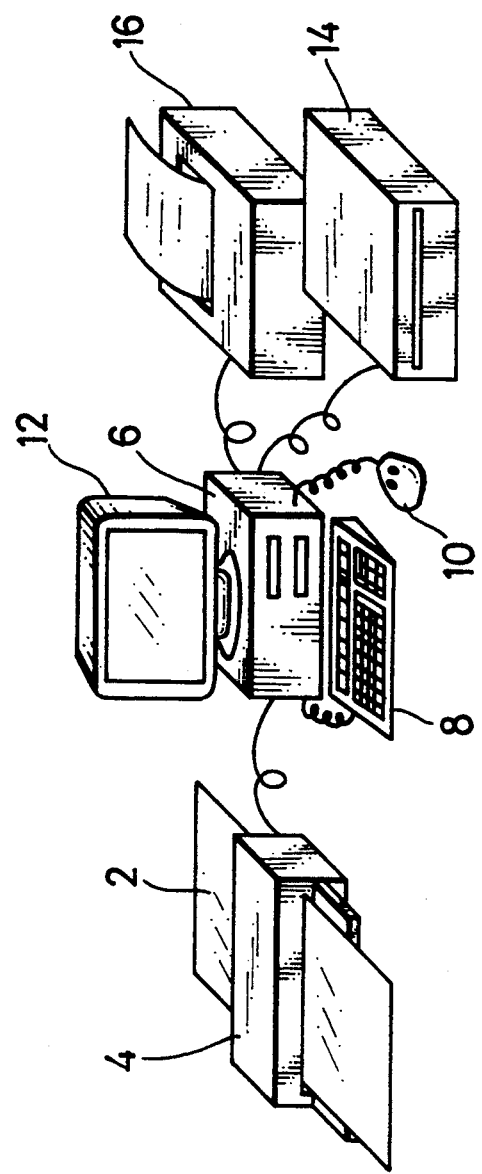
FIG. 1 is a perspective view showing the entire construction of an image editing system according to a first embodiment of the invention.

FIG. 1 shows the entire construction of an image editing system according to a first embodiment of the invention.

An original drawing 2 is a handwritten drawing, for example, and read by an image scanner 4 and information thereon is received as image data into a central processing unit (CPU) 6. The CPU 6 is connected to a keyboard 8, a mouse 10, a display 12, an /ptical disk device 14 and a plotter 16 in addition to the image scanner 4. The keyboard 8 is used to input various data into the CPU 6 and the mouse 10 is used to input coordinate information into the CPU 6. The display 12 is used to display image information represented by image data. Image data read by the image scanner 4 or image data processed (edited, for example) by the CPU 6 can be stored into the optical disk device 14 by means of the CPU 6. Image data stored into the optical disk device 14 (or image data processed by the CPU 6) can be derived from the plotter 16 via the CPU 6.

Figure 2:
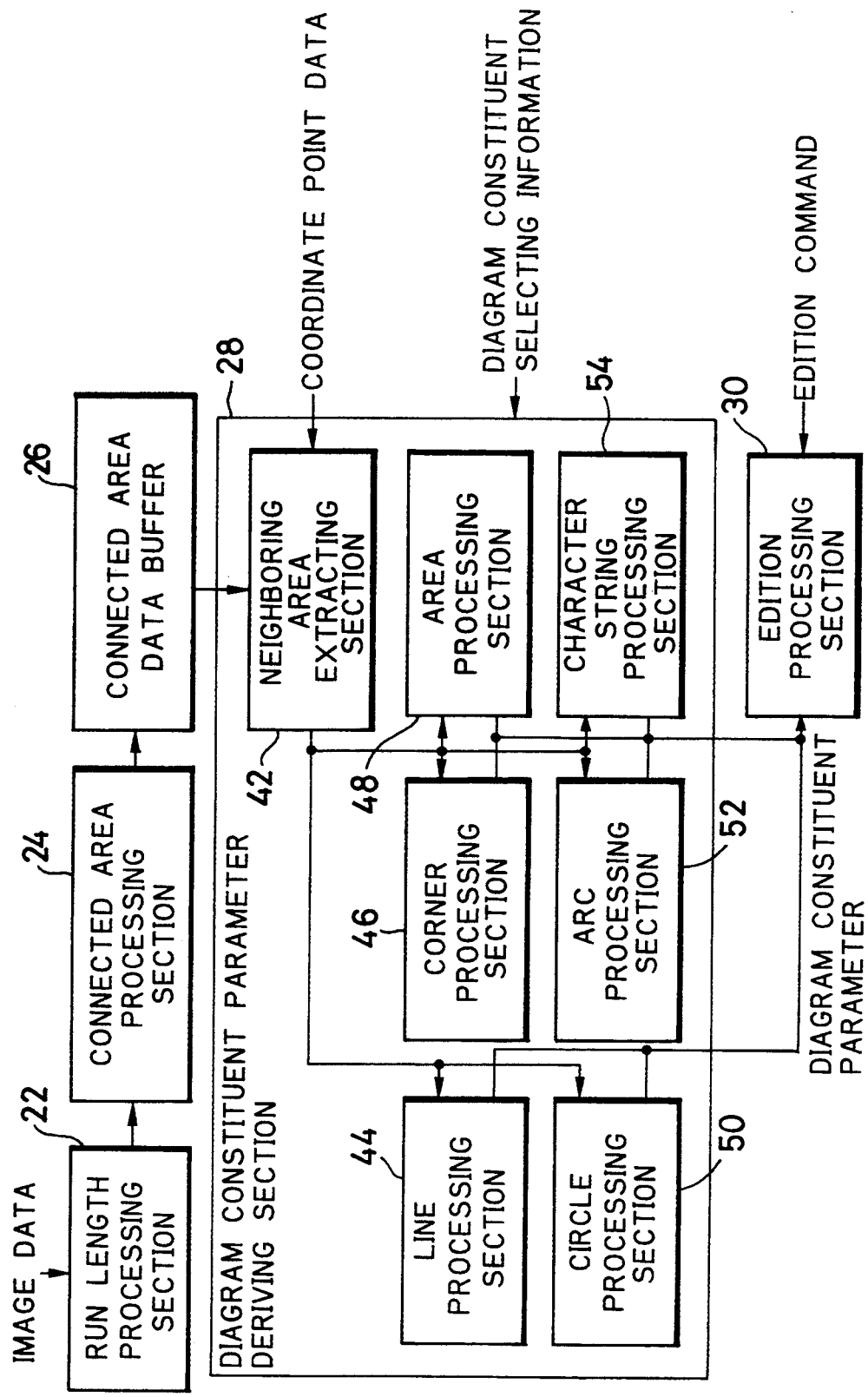
FIG. 2 is a block diagram showing the construction for illustrating the function of the image editing system of FIG. 1.

FIG. 2 shows the construction for effecting the process associated with the image editing operation in the CPU 6. The above function can be realized by executing the edition processing program in the CPU 6, &/r example. Therefore, the CPU 6 can be substantially regarded as having at least a run length processing section 22, connected area processing section 24, connected area buffer 26, diagram constituent parameter deriving section 28 and edition processing section 30.

Image data supplied from the image scanner 4 or optical disk device 14 to the CPU 6 is dot data corresponding to the matrix of an image screen. The dot data is converted to run length data represented by dot data string along the scanning line or by the length of run in the run length processing section 22. The run length data is collected for each connected area by means of the connected area processing section 24 and then stored into the connected area buffer 26. The connected area is an area formed by a set of run data connected to each other over adjacent lines. The connected area processing section 24 defines and extracts the connected area from the run length data and collects the run length data for each connected area. C/nnected area data stored in the connected area buffer 26 is supplied to the diagram constituent parameter deriving section 28. The diagram constituent parameter deriving section 28 selectively derives diagram constituent parameters such as the width and inclination of a line necessary for drawing the diagram constituent represented by the image data from the connected area data supplied from the connected area buffer 26. The diagram constituent parameters derived by the diagram constituent parameter deriving section 28 are supplied to the edition processing section 30. The edition processing section 30 effects the edition process for image data according to the edition command supplied from the keyboard 8 or mouse 10 and the diagram constituent parameters, for example.

The diagram constituent parameter deriving section 28 includes a neighboring area extracting section 42, straight line processing section 44, corner processing section 46, area processing section 48, circle processing section 50, arc processing section 52 and character string processing section 54.

The neighboring area extracting section 42 extracts a connected area lying adjacent to a coordinate point defined by coordinate point data input from the mouse 10. One of the straight line processing section 44, corner processing section 46, area processing section 48, circle processing section 50, arc processing section 52 and character string processing section 54 is selected according to diagram constituent selecting information specified by the keyboard 8 or other suitable means.

The straight line processing section 44 functions when a straight line is specified by the diagram constituent selecting information, and derives diagram constituent parameters of the line of the target connected area, for example, the vector of the core or central line, the 7idth and inclination of the line, and the position of a point at which a perpendicular drawn from a specified coordinate point intersects the line at right angles.

The corner processing section 46 functions when a line having a corner is specified by the diagram constituent selecting information, and derives diagram constituent parameters of the line having a corner of the target connected area, for example, the coordinate /f the line having a corner.

The area processing section 48 functions when the area of a diagram is specified by the diagram constituent selecting information, and derives diagram constituent parameters of the area of the target connected area, for example, the value of the area.

The circle processing section 50 functions when a circle is specified by the diagram constituent selecting information, and derives diagram constituent parameters of the circle of the target connected area, for example, the central point of the circle, the radius of the circle and the line width of the circle.

The arc processing section 52 functions when an arc is specified by the diagram constituent selecting information, and derives diagram constituent parameters of the arc of the target connected area, for example, the central point, the radius, the line width of the arc and the angles respectively made by lines passing the start and end points of the arc.

The character string processing section 54 functions when a character string is specified by the diagram constituent selecting information, and derives diagram constituent parameters of the character string of the target connected area, for example, the size (height, width) of the character, the character pitch and the inclination of the character.

Diagram constituent parameters derived by the straight line processing section 44, corner processing section 46, area processing section 48, circle processing section 50, arc processing section 52 or character string processing section 54 are supplied to the edition processing section 30 and used for the edition processing of the image data.

Next, the operation of the diagram editing system shown in FIGS. 1 and 2 is explained in detail.

Figure 3:
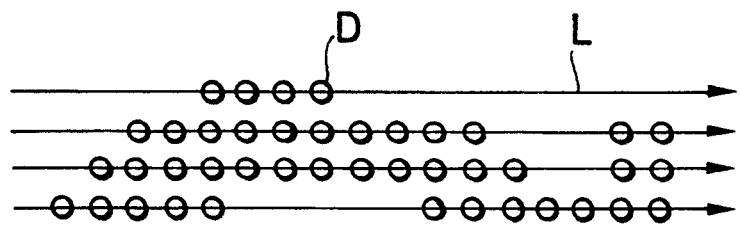
FIG. 3 is a model diagram showing an example of image data created by dot data.
Figure 4:
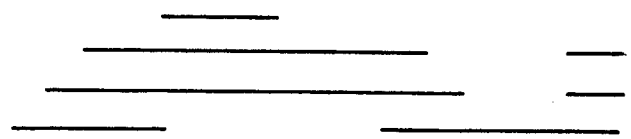
FIG. 4 is a model diagram showing an example of run length data obtained by converting the image data of FIG. 3.
Figure 5:
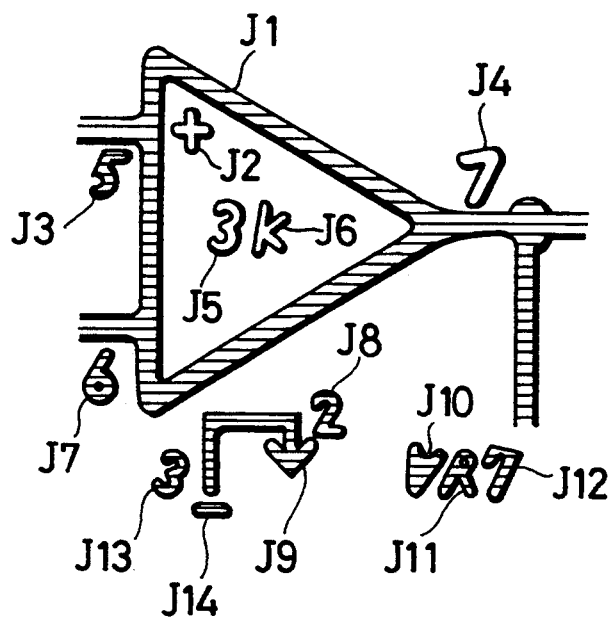
FIG. 5 is a model diagram showing a connected area.

In this system, in order to simplify the processing of image data, the image data is previously collected in the run length connected area and stored in the data buffer 26. That is, as shown in FIG. 3, when diagram data represented as a set of dot data D along a scan line L is input to the run length processing section 22, it is converted to run length data RL as shown in FIG. 4. When the run length data RL is input to the connected area processing section 24, the connected area processing section 24 checks whether or not each run length data connected each other in the direction orthogonal to the scan line direction, that is, whether or not adjacent lines are connected to each other, and extracts connected areas J1 to J14 as shown in FIG. 5, for example. The run length data items of the connected areas J1 to J14 are stored into the connected area data buffer 26.

The process effected when the image data is edited is explained below.

Figure 6:
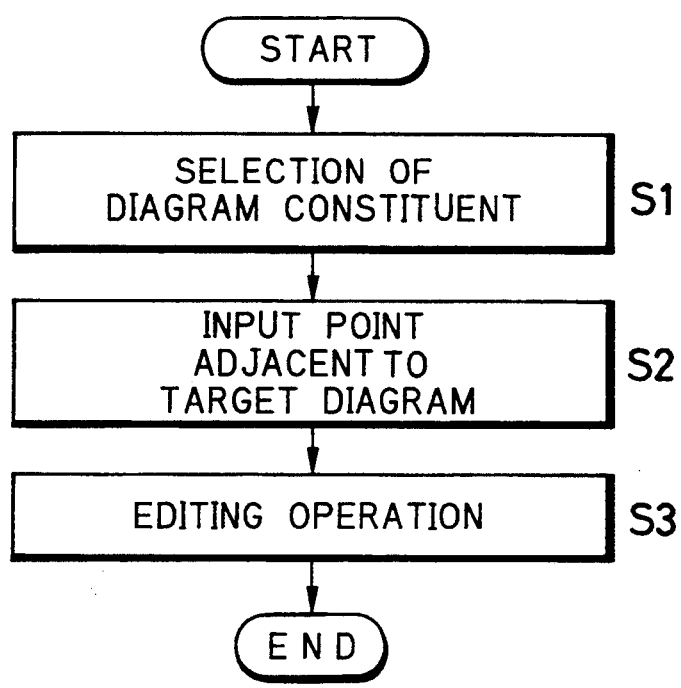
FIG. 6 is a flowchart showing the operation procedure effected by the operator of the image editing system of FIG. 1.

FIG. 6 shows the operation procedure effected by the operator when the image data is edited.

When editing the image data, the operator first selects a diagram constituent which is an object to be edited (step S1). That is, the operator selects one of a straight line, line having a corner, area, arc and character string as the diagram constituent to be edited and inputs the same to the system by use of the keyboard 8, for example.

Next, the operator specifies and inputs a coordinate point adjacent to the diagram to be edited to the system by operating the mouse 10 (step S2). The operation of specifying and inputting a coordinate point is effected for one to three positions according to the diagram to be edited. When a desired coordinate point is specified by the operator, one of the following processes is started according to the diagram constituent specified in the step S1 in this system.

(a) Straight Line Process

Figure 7:
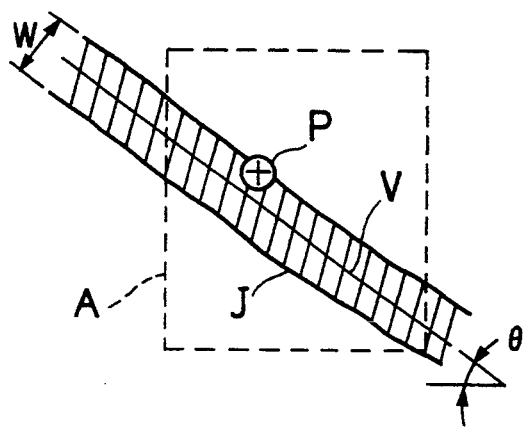
FIG. 7 is a model diagram for illustrating the process of extracting parameters of a straight line in the image editing system of FIG. 1.

When the specified diagram constituent shows a straight line, the straight line processing section 44 of FIG. 2 functions, and as shown in FIG. 7, a connected area J lying adjacent to a coordinate point P specified by the operator is derived out from the data buffer 26 by the neighboring area extracting section 42 and the central line vector V of the straight line, the 7idth W of the line, the inclination $\theta$ of the line and the position of a point at which a perpendicular drawn from the specified coordinate point P intersects the line at right angles are derived as the diagram constituent parameters of the straight line of the connected area J, for example. The parameters are used to extend a straight line or add a straight line which intersects at right angles with a straight line.

Figure 13:
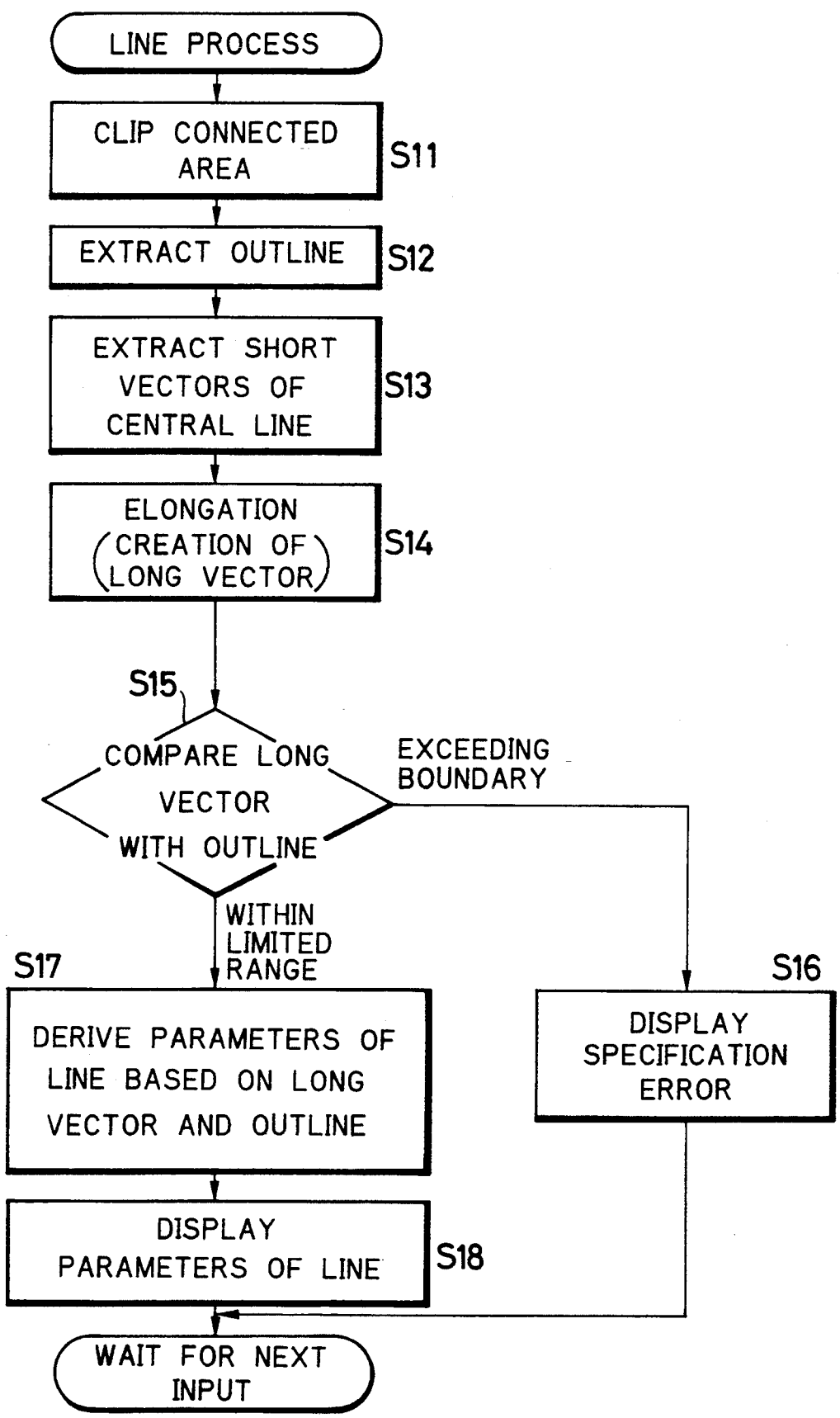
FIG. 13 is a flowchart for illustrating the process of extracting parameters of a straight line in the image editing system of FIG. 1.

The flowchart of FIG. 13 shows the process by the straight line processing section 44.

First, a preset area A including the specified coordinate point P of the connected area as shown in FIG. 7 is clipped by means of the neighboring area extracting section 42 (step S11). The reason why part of the connected area is clipped is to limit the number of data items to be processed and enhance the processing speed in the data processing operation. Then, the outline of the connected area in the preset area A is extracted (step S12) and short vectors of a central line are extracted according to the outline (step S13). The short vectors can be easily obtained by sequentially deriving an intermediate point between crossing points, at which a line intersecting at right angles with the outlines crosses the respective outlines, at a preset interval along the outlines. Next, a long vector is created by combining the short vectors derived in the step S13 (step S14) for line-elongation. The long vector can be easily obtained by use of the least square method which is well known in the art and therefore the detailed explanation for the procedure is omitted here. Next, the long vector obtained in the step S14 is compared with the outlines (step S15), and it is defined that the long vector extends out of the connected area J when they cross each other, then it is determined that the diagram constituent has not been correctly specified and a message of "specification error" is displayed (step S16). If there is no excessive extension of the long vector beyond the boundary, the diagram constituent parameters are derived based on the long vector and the outlines (step S17) and the diagram constituent parameters are displayed on the display 12 (step S18).

(b) Corner Process

Figure 8:
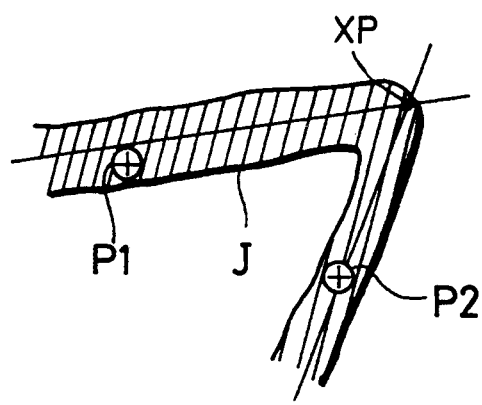
FIG. 8 is a model diagram for illustrating the process of extracting parameters of a line having a corner in the image editing system of FIG. 1.

When the specified diagram constituent shows a line having a corner, the corner processing section 46 of FIG. 2 functions, and as shown in FIG. 8, the coordinate of a crossing point between two lines passing adjacent to two coordinate points P1 and P2 specified by the operator, that is, the coordinate of a corner point XP is derived as the diagram constituent parameter. The coordinate of the corner point can be used as a reference point when the editing operation is effected.

Figure 14:
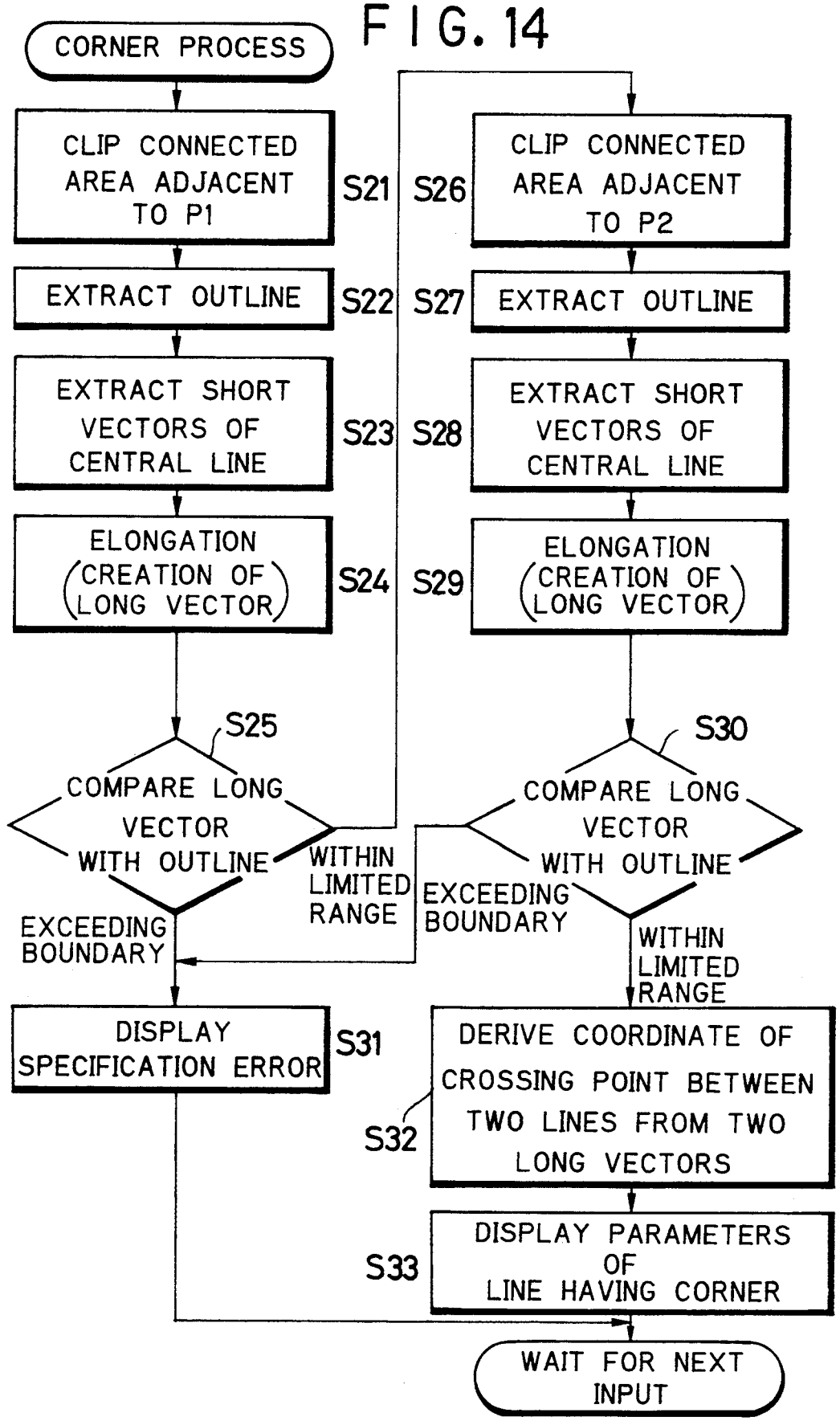
FIG. 14 is a flowchart for illustrating the process of extracting parameters of a line having a corner in the image editing system of FIG. 1.

The flowchart of FIG. 14 shows the process of the corner processing section 46.

Steps S21 to S25 are the process for deriving a central line vector of a line lying adjacent to the first specified coordinate point P1 and steps S26 to S30 are the process for deriving a central line vector of a line lying adjacent to the second specified coordinate point P2. The processes and the display of "specification error" in the step S31 are substantially the same as those in the case of the process for the line shown in FIG. 13. That is, a preset area of the connected area adjacent to the first specified coordinate point P1 is clipped by means of the neighboring area extracting section 42 (step S21). Then, the outline of the clipped area of the connected area is extracted (step S22) and short vectors of the central line are extracted based on the outline (step S23). Next, the short vectors obtained in the step S23 are processed for line-elongation to create a long vector (step S24). After this, the outlines and the long vector obtained in the step S24 are compared with each other (step S25 and when they cross each other, it is defined that the long vector exceeds the range of the connected area J, then it is determined that the diagram constituent has not been correctly specified and a message of "specification error" is displayed (step S31). If there is no excessive extension of the long vector beyond the boundary, a preset area of the connected area adjacent to the second specified coordinate point P2 is clipped by means of the neighboring area extracting section 42 (step S26). Then, the outline of the connected area in the clipped area is extracted (step S27) and short vectors of a central line are extracted based on the outline (step S28). Next, a long vector is created by subjecting the short vectors obtained in the step S28 to the line-elongation process (step S29). After this, the outlines and the long vector obtained in the step S29 are compared with each other (step S30), and when they cross each other, it is defined that the long vector exceeds the range of the connected area, then it is determined that the diagram constituent has not been correctly specified and a message of "specification error" is displayed (step S31). If it is determined in the step S30 that there is no excessive extension of the long vector beyond the boundary, two long vectors corresponding to the two specified coordinate points P1 and P2 can be derived. When two long vectors are thus derived, the coordinate of a crossing point therebetween is derived (step S32) and the coordinate of the crossing point is displayed as the diagram constituent parameter of the corner (step S33).

(c) Area Process

Figure 9:
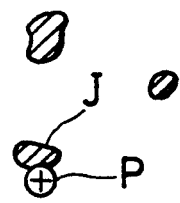
FIG. 9 is a model diagram for illustrating the process of extracting parameters of an area in the image editing system of FIG. 1.

When the specified diagram constituent shows an area, the area processing section 48 of FIG. 2 functions, and as shown in FIG. 9, a connected area J lying adjacent to the coordinate point P specified by the operator is extracted by the neighboring area extracting section 42 and the area of the connected area J lying adjacent to the coordinate point P is derived as the diagram constituent parameter. F/r example, when unnecessary dots are included in the image, it is convenient to use the area of the connected area in order to selectively remove the unnecessary dots.

Figure 15:
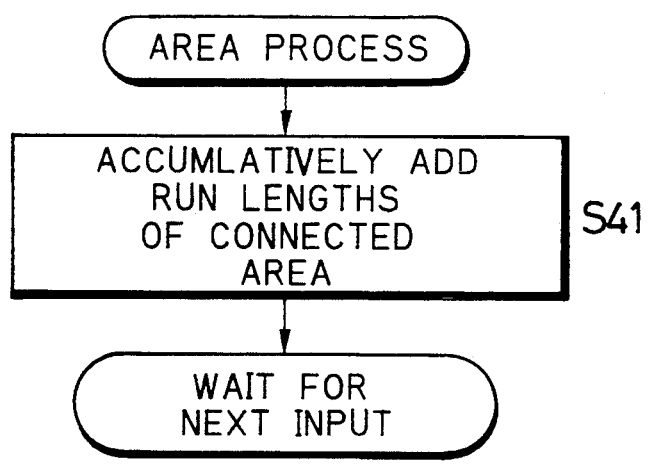
FIG. 15 is a flowchart for illustrating the process of extracting parameters of an area in the image editing system of FIG. 1.

In this case, the area processing section 48 accumulatively adds the run lengths of the connected area J lying adjacent to the coordinate point P specified by the operator (step S41) to derive area information of the connected area J as shown in the flowchart of FIG. 15. Then, for example, when the thus derived area information is smaller than a preset area value, the isolated infinitesimal connected area is removed from the image data. Like the black connected area in the white area of the image data, a white connected area in the black area of the image data can be derived in the same manner as described above.

(d) Circle Process

Figure 10:
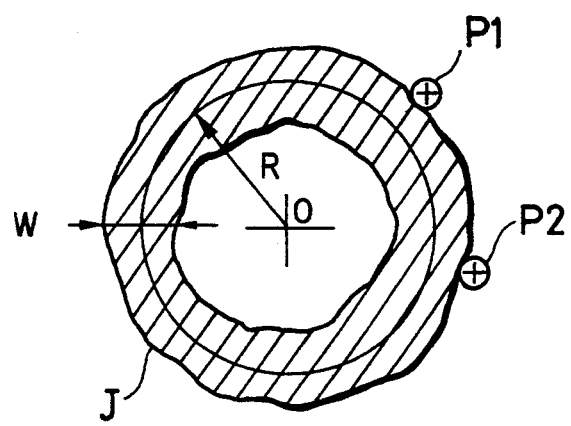
FIG. 10 is a model diagram for illustrating the process of extracting parameters of a circle in the image editing system of FIG. 1.

When the specified diagram constituent shows a circle, the circle processing section 50 of FIG. 2 functions, and as shown in FIG. 10, a connected area J lying adjacent to both of the coordinate points P1 and P2 specified by the operator is extracted by the neighboring area extracting section 42 and the central point O, the radius R and the line width W of the circle constructed by the connected area J are derived as the diagram constituent parameters, for example.

Figure 16:
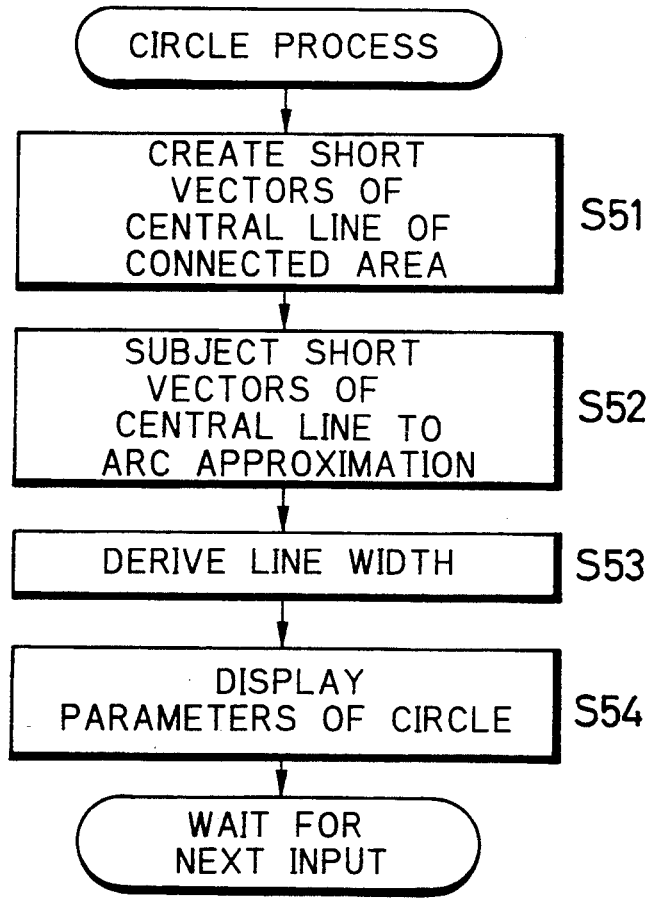
FIG. 16 is a flowchart for illustrating the process of extracting parameters of a circle in the image editing system of FIG. 1.

The flowchart of FIG. 16 shows the process effected by the circle processing section 50.

Like the case of the straight line shown in FIG. 13, in the case of a circle, short vectors of a central line are derived from the connected area (step S51) and arc information approximated to a series of short vectors is derived by approximating the short vectors obtained in the step S51 to an arc form (step S52). The curvature of an arc necessary at the time of arc approximation can be easily derived from the rate of variation in the inclination of the short vectors. Further, the line width of the arc information is derived (step S53). Then, the thus derived parameters are displayed as the diagram constituent parameters of the circle (step S54).

(e) Arc Process

Figure 11:
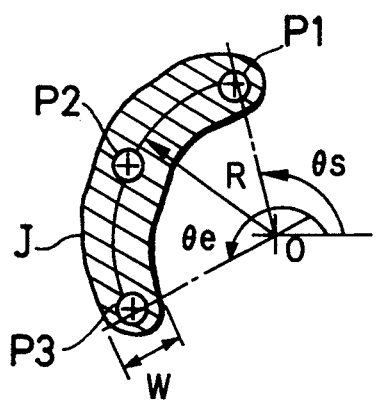
FIG. 11 is a model diagram for illustrating the process of extracting parameters of an arc in the image editing system of FIG. 1.

When the specified diagram constituent shows an arc, the arc processing section 52 of FIG. 2 functions, and as shown in FIG. 11, a connected area J lying adjacent to three coordinate points P1, P2 and P3 specified by the operator is extracted by the neighboring area extracting section 42 and the central point O, the radius R, the line width W of the arc and angles $\theta s$ and $\theta e$ made by lines respectively passing the start and end points of the arc are derived as the diagram constituent parameters, for example.

Figure 17:
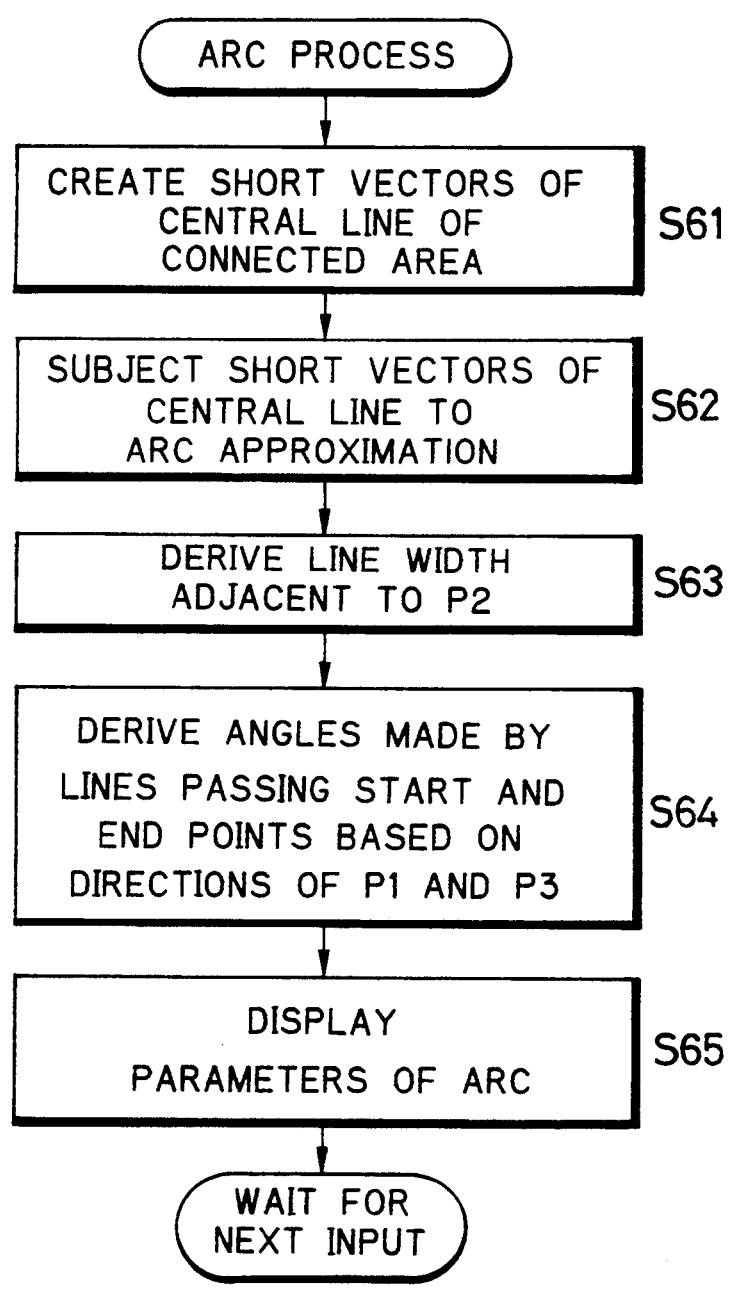
FIG. 17 is a flowchart for illustrating the process of extracting parameters of an arc in the image editing system of FIG. 1.

The flowchart of FIG. 17 shows the process effected by the arc processing section 52.

Like the case of the circle shown in FIG. 16, in the case of an arc, short vectors are subjected to the arc-approximation. That is, short vectors of the central line are derived from the connected area J (step S61) and arc information approximated to a series of short vectors is derived by approximating the short vectors obtained in the step S61 to an arc form (step S62). Further, the line width for a portion near the second specified coordinate point P2 is used as the line width of the arc information (step S63). Then, an angle made by a line connecting the central point and the first specified coordinate point P1 which is the start point of the arc and an angle made by a line connecting the central point and the third specified coordinate point P3 which is the end point of the arc are derived (step S64). Then, the thus derived parameters are displayed as the diagram constituent parameters of the arc (step S65).

(f) Character String Process

Figure 12:
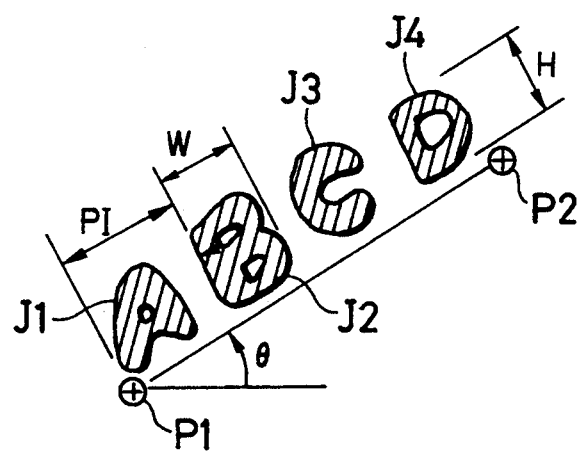
FIG. 12 is a model diagram for illustrating the process of extracting parameters of a character string in the image editing system of FIG. 1.

When the specified diagram constituent shows a character string, the character string processing section 54 of FIG. 2 functions, and as shown in FIG. 12, a straight line connecting two coordinate points P1 and P2 specified by the operator is used as a reference line, one or more connected areas, for example, four connected areas J1 to J4 in the case of FIG. 12 lying adjacent to the reference line are extracted by the neighboring area extracting section 42, and the size (for example, the height H and width W of the characters), the character pitch PI and the inclination $\theta$ of the characters (character string) constructed by the connected areas J1 to J4 are derived as the diagram constituent parameters, for example.

Figure 18:
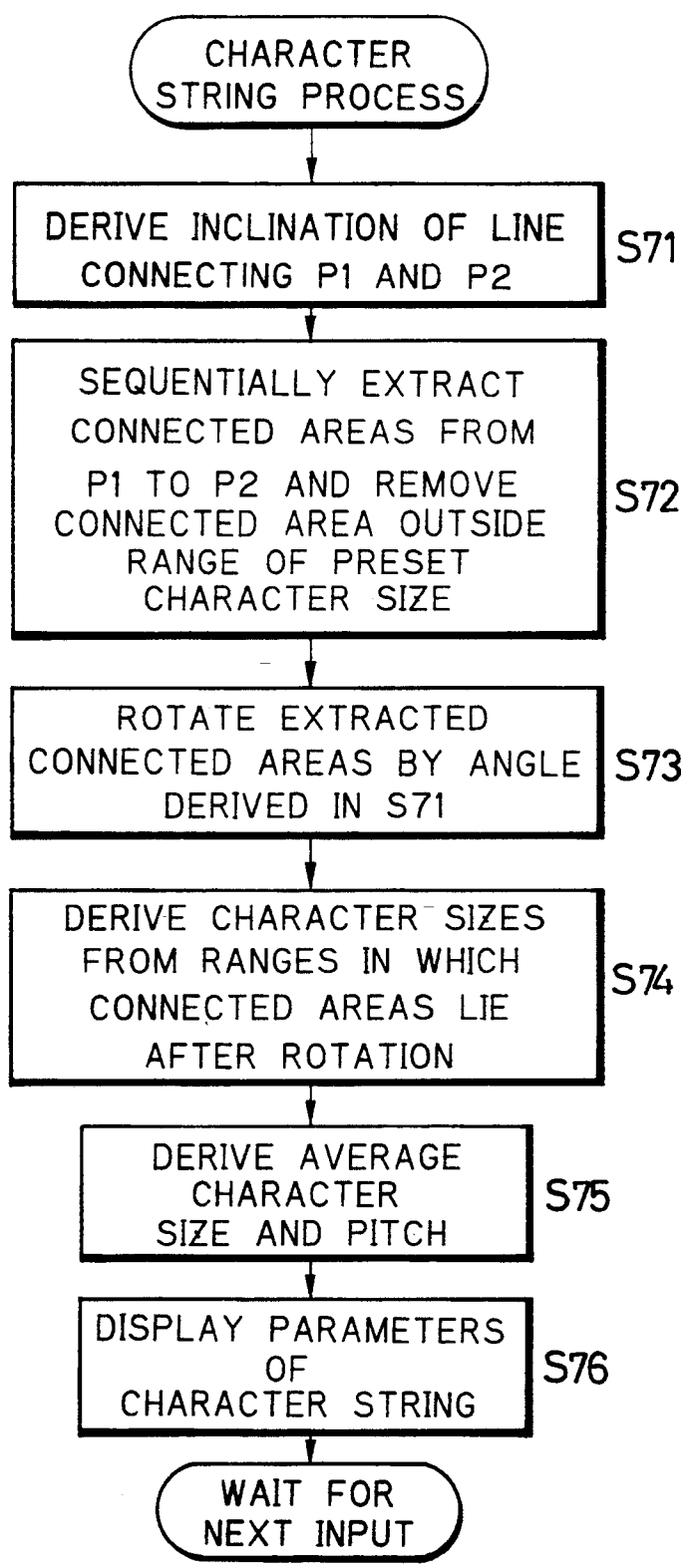
FIG. 18 is a flowchart for illustrating the process of extracting parameters of a character string in the image editing system of FIG. 1.

The flowchart of FIG. 18 shows the process effected by the character string processing section 54.

First, the inclination $\theta$ of a straight line connecting the first and second specified coordinate points P1 and P2 is derived (step S71). Then, the connected areas are sequentially extracted from the first specified coordinate point P1 towards the second specified coordinate point P2 by the neighboring area extracting section 42, and if characters of sizes exceeding the preset size range of characters previously set or prepared in the system, such characters are removed (step S72). Next, the connected areas J1 to J4 extracted in the step S72 are rotated by the angle $\theta$ derived in the step S71 (step S73) and the character size is derived based on the range in which the connected areas J1 to J4 which have been rotated are present (step S74). After the character sizes of all of the characters in the character string of the connected areas J1 to J4, the average character size and character pitch are derived (step S75). Then, the thus derived parameters are displayed as the diagram constituent parameters of the character string (step S76).

The diagram constituent parameters thus derived are not only displayed but also stored as required.

The operator effects the editing operation of image data such as addition or correction of image data without troublesome setting of parameters by using the diagram constituent parameters derived in the above-described manner (step S3).

For example, when a straight line is extended, the operator selects a straight line as the diagram constituent in the step S1 and then specifies a coordinate point adjacent to a target line to be extended in the step S2. By the above operations, the diagram constituent parameters of the target line, for example, the central line vector V, the width W and the inclination $\theta$ of the straight line and the position at which a perpendicular drawn from the specified coordinate point P intersects the straight line at right angles are derived by means of the straight line processing section 44 according to the flowchart shown in FIG. 13. Then, the operator effects the operation of extending the target straight line in the step S3. At this time, the operator can easily effect the operation of extending the target straight line by using the diagram constituent parameters of the target line derived in the above-described manner, that is, the central line vector V, the width W and the inclination $\theta$ of the target straight line.

As described above, since the operation of editing image data is effected by use of the diagram constituent parameters which have been derived by a simple operation prior to the image data editing operation, the troublesome operation of setting parameters becomes unnecessary, thereby making the editing operation extremely simple.

Figure 19:
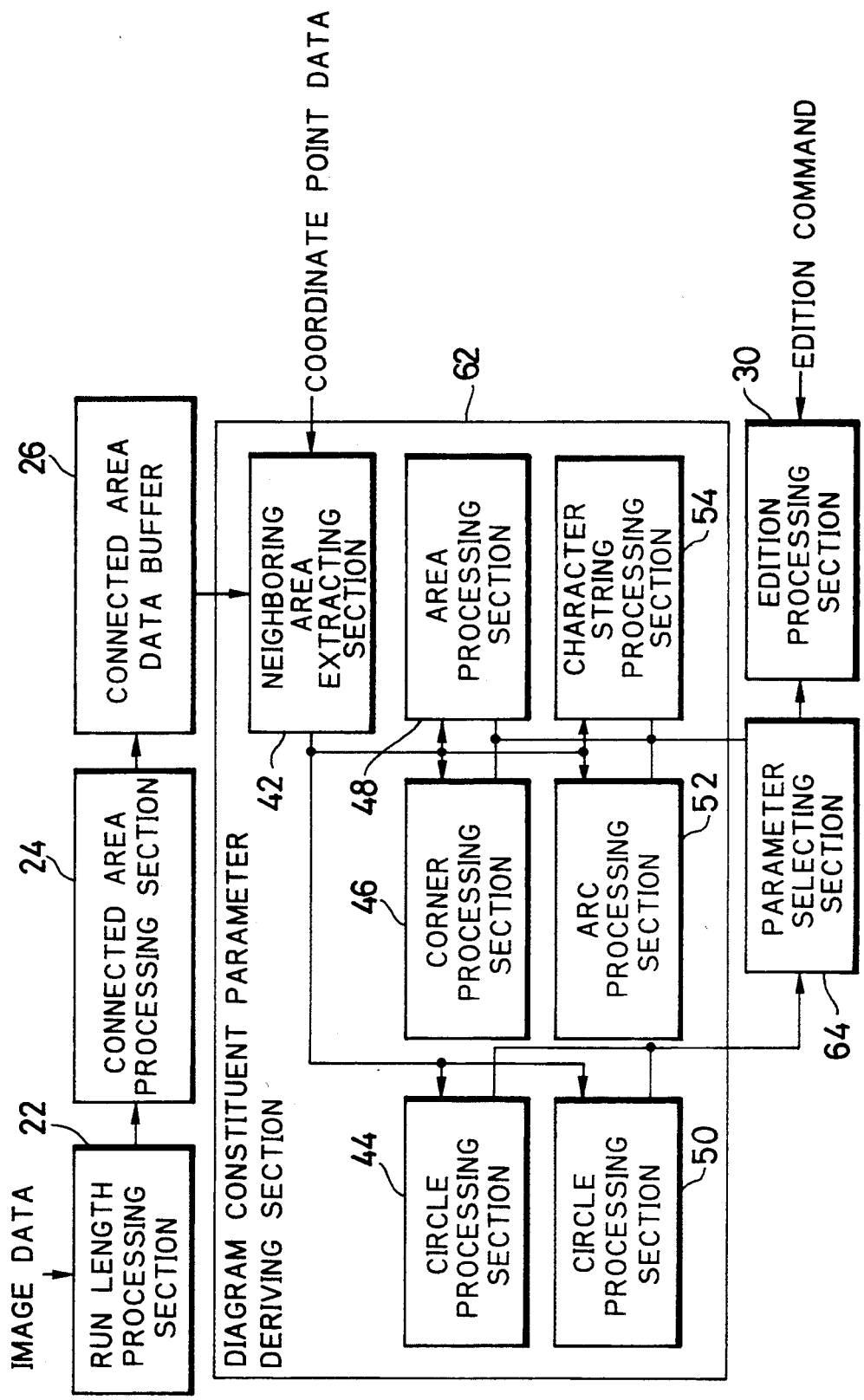
FIG. 19 is a block diagram showing the construction for illustrating the function of an image editing system according to a second embodiment of the invention.

FIG. 19 shows the construction for effecting the process associated with the image data editing operation of the image data editing system according to a second embodiment of the invention. In FIG. 19, portions which are substantially the same as those of FIG. 2 are denoted by the same reference numerals and the detailed explanation thereof is omitted.

In the first embodiment described before, a diagram constituent is specified by the operator and only the parameters specified by the diagram constituent are derived. In contrast, in the image data editing system of the second embodiment of the invention shown in FIG. 19, processes for the extracted connected areas are effected by applying the extracted connected areas to all of the diagram constituents of, for example, the above-described straight line and circle, and the best matching result is output as the parameters so that the suitable diagram constituent can be substantially automatically specified. In this case, time required for effecting the process becomes longer than that in the first embodiment, but the operation can be more simplified.

That is, in this case, the CPU 6 is substantially regarded as having at least a run length processing section 22, connected area processing section 24, connected area buffer 26, diagram constituent parameter deriving section 62, edition processing section 30 and parameter selecting section 64.

Connected area data stored in the connected area buffer 26 is supplied to the diagram constituent deriving section 62. The diagram constituent deriving section 62 derives diagram constituent parameters such as the width and inclination of a line which are necessary to draw the diagram constituent represented by image data for all of the diagram constituents based on the connected area data supplied from the connected area buffer 26. The parameter selecting section 64 selects those of the diagram constituent parameters of the respective diagram constituents derived by the diagram constituent deriving section 62 which are best matched with the connected area data, that is, the diagram constituent parameters of the diagram constituent which have the least contradiction with respect to the connected area data and supplies the selected parameters to the edition processing section 30.

Like the diagram constituent deriving section 28, the diagram constituent deriving section 62 includes a neighboring area extraction section 42, straight line processing section 44, corner processing section 46, area processing section 48, circle processing section 50, arc processing section 52 and character string processing section 54. The straight line processing section 44, corner processing section 46, area processing section 48, circle processing section 50, arc processing section 52 and character string processing section 54 sequentially function in a serial or parallel fashion. All of the processing results of the straight line processing section 44, corner processing section 46, area processing section 48, circle processing section 50, arc processing section 52 and character string processing section 54 are supplied to the parameter selecting section 64.

Figure 20:
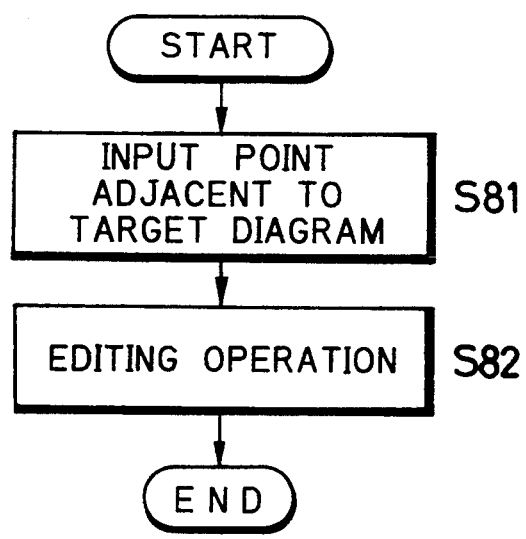
FIG. 20 is a flowchart showing the operation procedure effected by the operator of the image editing system of FIG. 19.

The operation procedure effected by the operator at the image data editing time is shown in FIG. 20.

When image data is edited, the operator first specifies and inputs a coordinate point adjacent to the target diagram to the system (step S81). The operation of specifying and inputting the coordinate point is effected for one to three positions according to the target diagram. When a desired coordinate point is specified by the operator, diagram constituent parameters for all of the diagram constituents previously prepared are derived in the system and those of the diagram constituent parameters which are most suitably applied to the target diagram are selected. Then, the operator uses the thus derived diagram constituent parameters to effect the edition of image data such as addition or correction of image data without effecting the troublesome parameter setting operation (step S82).

Figure 21:
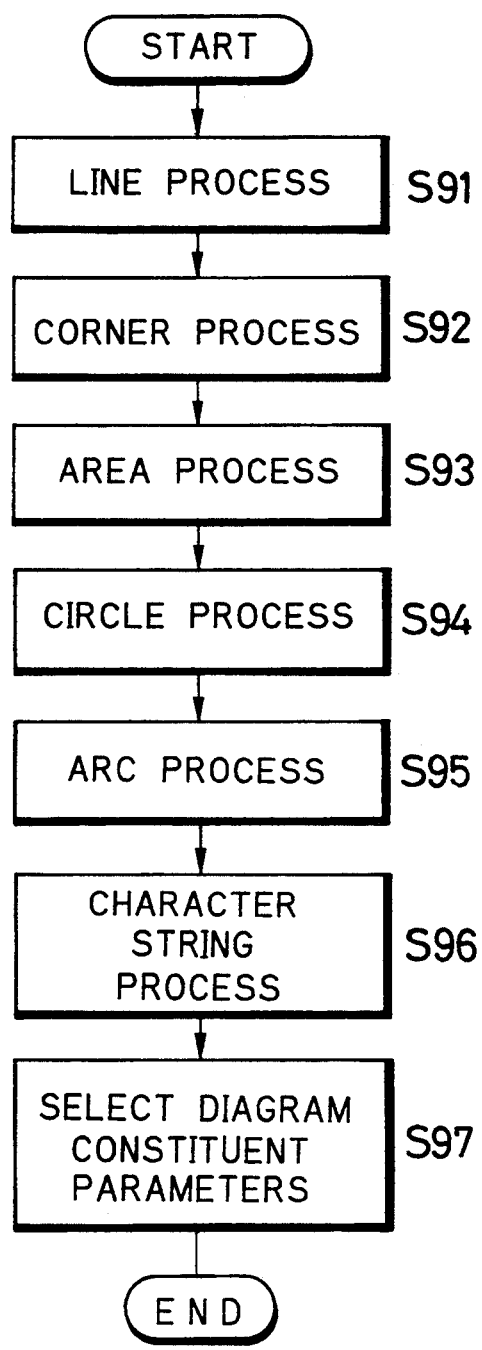
FIG. 21 is a flowchart showing the process of deriving diagram constituent parameters and selecting parameters in the image editing system of FIG. 19.

The flowchart of FIG. 21 shows the processes in the diagram constituent parameter deriving section 62 and parameter selecting section 64 in detail.

That is, the straight line process (step S91), corner process (step S92), area process (step S93), circle process (step S94), arc process (step S95) and character string process (step S96) which are respectively shown in FIGS. 13, 14, 15, 16, 17 and 18 are sequentially effected by means of the straight line processing section 44, corner processing section 46, area processing section 48, circle processing section 50, arc processing section 52 and character string processing section 54 and then the diagram constituent parameters of the diagram constituent which is best matched with the actual target connected area are selected from the diagram constituent parameters obtained in the steps S91 to S96 (step S97).

In the image data editing system of the second embodiment, the diagram constituent parameters of a desired connected area are derived by simply specifying the desired connected area by the operation of the operator and the thus derived parameters are used in the succeeding editing process. Therefore, in a case where image data constituted by a set of dot data is corrected, it is not necessary for the operator to set parameters by trial and error, making it possible to significantly enhance the efficiency of the editing operation.

Further, a method of specifying the connected area is not limited to the method effected by specifying the coordinate point or points in the above-described manner, but a method of specifying a rectangular area and extracting a connected area lying in the rectangular area may be used, for example.

Further, only the width W and inclination $\theta$ of the straight line may be used as the diagram constituent parameters of the straight line. Character fonts may be used in addition to the size, character pitch and inclination of the characters as diagram constituent parameters of a character string when a plurality of types of characters or a plurality of character fonts can be used for the characters.

Further, different types of lines or fully painted patterns may be used instead of the above diagram constituents as target diagram constituents. For example, as diagram constituent parameters associated with the types of lines, it is possible to use the form of line (for example, determination of solid line, broken line, one-dot chain line or two-dot chain line), the line pitch of dashes when the line form is a broken line, the length of the dash and the distance between the dash and dot when the line form is a one-dot chain line, and the length of the dash, the distance between the dash and dot and the distance between the dots when the line form is a two-dot chain line, for example. As diagram constituent parameters associated with the fully painted patterns, it is possible to use the types of fully painted patterns, the direction of the fully painted pattern and the dimensions of specified portions of each fully painted pattern, for example.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method for editing image data including:
   a first step of specifying a desired connected area which is formed of connected-dot data and contained in image data represented as a set of dot data;
   a second step of deriving a diagram constituent and diagram constituent parameters corresponding to the image data of the connected area specified in said first step from the image data;
   said diagram constituent parameters including a set of parameters selected from: a central line vector; a width of a line constituent of a diagram; an inclination of the line constituent; a position of a point at which a perpendicular from a specified coordinate point intersects the line constituent at right angles; a position of a crossing point between two line constituents; an area of a connected area constituent of the diagram; a position of a center of a circle constituent of the diagram; a radius of the circle; a line width of the circle; a position of a center of an arc constituent of the diagram; a position of a start point of the arc; a position of an end point of the arc; a radius of curvature of the arc; a line width of the arc; inclinations of lines passing through the start and end points of the arc; a height of a character constituent of the diagram; a width of the character; a pitch of the character; and an inclination of the character; and a third step of effecting the process of editing the image data by use of the diagram constituent parameters derived in said second step.

2. A method according to claim 1, wherein said first step includes:
a step of specifying a desired coordinate point in a space defined by the image data; and
a step of extracting a connected area constructed by connected-dot data adjacent to the point specified by the above step.

3. A method according to claim 1, wherein said first step includes:
a step of specifying a desired coordinate area in a space defined by the image data; and
a step of extracting a connected area constructed by connected-dot data in said coordinate area specified by the above step.

4. A method according to claim 1, wherein said second step includes:
a step of discriminating a diagram constituent of the image data in said connected area; and
a step of deriving parameters corresponding to the diagram constituent obtained in the above step for the image data of said connected area.

5. A method according to claim 1, wherein said second step includes:
a temporarily specifying step of temporarily allotting a plurality of diagram constituents to the image data in said connected area;
a step of deriving diagram constituent parameters corresponding to the diagram constituents temporarily allotted in said temporarily specifying step for the image data of said connected area; and
a step of selecting those of said diagram constituent parameters corresponding to the respective diagram constituents and derived in the above step which are best matched to the image data of said connected area.

6. A method according to claim 1, wherein said third step includes:
at least a step of adding image data to the image data of said connected area by using said diagram constituent parameters derived in said second step.

7. A method for editing image data including:
a first step of specifying a desired connected area which is formed of connected-dot data to be an element of a diagram, said connected area being selected from image data represented as a set /f dot data;
a second step of specifying a diagram constituent corresponding to the connected area specified in said first step;
a third step of deriving, from the image data of said connected area specified in said first step, diagram constituent parameters indicating a characteristic of the diagram corresponding to the diagram constituent in said second step;
said diagram constituent parameters including a subset of parameters selected from a set of parameters consisting essentially of: a central line vector; a width of a line constituent of a diagram; an inclination of the line constituent; a position of a point at which a perpendicular from a specified coordinate point intersects the line constituent at right angles; a position of a crossing point between two line constituents; an area of a connected area constituent of the diagram; a position of a center of a circle constituent of the diagram; a radius of the circle; a line width of the circle; a position of a center of an arc constituent of the diagram; a position of a start point of the arc; a position of an end point of the arc; a radius of curvature of the arc; a line width of the arc; inclinations of lines passing through the start and end points of the arc; a height of a character constituent of the diagram; a width of the character; a pitch of the character; and an inclination of the character; and a fourth step of editing the image data by using the diagram constituent parameters derived in said third step.

8. A method according to claim 7, wherein said first step includes:
a step of specifying a desired coordinate point in a space defined by the image data; and
a step of extracting a connected area constructed by connected-dot data adjacent to the point specified by the above step.

9. A method according to claim 7, wherein said first step includes:
a step of specifying a desired coordinate area in a space defined by the image data; and
a step of extracting a connected area constructed by connected-dot data in said coordinate area specified by the above step.

10. A method according to claim 7, wherein said fourth step includes:
at least a step of adding image data to the image data of said connected area by using said diagram constituent parameters derived in said third step.

11. An apparatus for editing image data comprising:
area specifying means for specifying a desired connected area which is formed of connected-dot data to be an element of a diagram, said connected area being selected from image data represented as a set of dot data;
diagram constituent parameter extracting means for deriving a diagram constituent and diagram constituent parameters indicating a characteristic of the diagram corresponding to the image data from the image data of said connected area specified by said area specifying means;
said diagram constituent parameter extracting means including means for extracting a subset of parameters from a set of parameters consisting essentially of: a central line vector; a width of a line constituent of a diagram; an inclination of the line constituent; a position of a point at which a perpendicular from a specified coordinate point intersects the line constituent at right angles; a position of a crossing point between two line constituents; an area of a connected area constituent of the diagram; a position of a center of a circle constituent of the diagram; a radius of the circle; a line width of the circle; a position of a center of an arc constituent of the diagram; a position of a start point of the arc; a position of an end point of the arc; a radius of curvature of the arc; a line width of the arc; inclinations of lines passing through the start and end points of the arc; a height of a character constituent of the diagram; a width of the character; a pitch of the character; and an inclination of the character; and edition processing means for effecting a process of editing the image data by use of the diagram constituent parameters derived by said diagram constituent parameter extracting means.

12. An apparatus according to claim 11, wherein said area specifying means includes:
   pointing means for specifying a desired coordinate point in a space defined by said image data; and
   connected area extracting means for extracting a connected area constructed by connected-dot data adjacent to the point specified by said pointing means.

13. An apparatus according to claim 11, wherein said area specifying means includes:
   pointing means for specifying a desired coordinate area in a space defined by the image data; and
   connected area extracting means for extracting a connected area constructed by connected-dot data in said coordinate area specified by said pointing means.

14. An apparatus according to claim 11, wherein said connected area extracting means includes:
   diagram constituent discriminating means for discriminating a diagram constituent of the image data in said connected area; and
   diagram constituent parameter deriving means for deriving diagram constituent parameters corresponding to the diagram constituent derived by said diagram constituent discriminating means for the image data of said connected area.

15. An apparatus according to claim 11, wherein said diagram constituent parameter extracting means includes:
   temporarily specifying means for temporarily allotting a plurality of diagram constituents to the image data in said connected area;
   diagram constituent parameter extracting means for deriving diagram constituent parameters corresponding to the diagram constituents temporarily allotted by said temporarily specifying means for the image data of said connected area; and
   diagram constituent selecting means for selecting those of said diagram constituent parameters corresponding to the respective diagram constituents and derived by said diagram constituent parameter extracting means which are best matched to the image data of said connected area.

16. An apparatus according to claim 11, wherein said edition processing means includes:
   at least data adding means for adding image data to the image data of said connected area by using the diagram constituent parameters derived by said diagram constituent parameter extracting means.

17. An apparatus of editing image data comprising:
   area specifying means for specifying a desired connected area which is formed of connected-dot data to be an element of a diagram, said connected area being selected from image data represented as a set of dot data;
   diagram constituent specifying means for specifying a diagram constituent corresponding to the connected area specified by said area specifying means;
   diagram constituent parameter extracting means for deriving diagram constituent parameters indicating a characteristic of the diagram corresponding to the diagram constituent specified by said diagram constituent specifying means from the image data of the connected area specified by said area specifying means;
   said diagram constituent parameter extracting means including means for extracting a set of parameters from: a central line vector; a width of a line constituent of a diagram; an inclination of the line constituent; a position of a point at which a perpendicular from a specified coordinate point intersects the line constituent at right angles; a position of a crossing point between two line constituents; an area of a connected area constituent of the diagram; a position of a center of a circle constituent of the diagram; a radius of the circle; a line width of the circle; a position of a center of an arc constituent of the diagram; a position of a start point of the arc; a position of an end point of the arc; a radius of curvature of the arc; a line width of the arc; inclinations of lines passing through the start and end points of the arc; a height of a character constituent of the diagram; a width of the character; a pitch of the character; and an inclination of the character; and
   edition processing means for effecting a process of editing the image data by use of the diagram constituent parameters derived by said diagram constituent parameter extracting means.

18. An apparatus according to claim 17, wherein said area specifying means includes:
   pointing means for specifying a desired coordinate point in a space defined by said image data; and
   connected area extracting means for extracting a connected area constructed by connected-dot data adjacent to the point specified by said pointing means.

19. An apparatus according to claim 17, wherein said area specifying means includes:
   pointing means for specifying a desired coordinate area in a space defined by the image data; and
   connected area extracting means for extracting a connected area constructed by connected-dot data in said coordinate area specified by said pointing means.

20. An apparatus according to claim 17, wherein said edition processing means includes:
   at least data adding means for adding image data to the image data of said connected area by using the diagram constituent parameters derived by said diagram constituent parameter extracting means.

21. A method according to claim 1, wherein said first step comprises identifying an existing diagram constituent, said second step comprises determining diagram constituent parameters of the existing constituent of the diagram, and said third step comprises setting parameters of an edited constituent of the diagram to match parameters of the existing constituent.

22. A method according to claim 21, comprising the further step of identifying an additional constituent of the diagram to be added thereto, wherein said third step comprises setting parameters of the additional constituent of the diagram to match said parameters of the existing constituent.

23. An apparatus as recited in claim 11, wherein said edition processing means is responsive to the diagram constituent parameter extracting means for editing the image data by generating a diagram constituent specified by the diagram constituent parameters derived by said diagram constituent parameter extracting means, the generated diagram constituent fitting in the image data of the connected area.

24. An apparatus as recited in claim 17, wherein said edition processing means is responsive to the diagram constituent parameter extracting means for editing the image data by generating a diagram constituent specified by the diagram constituent parameters derived by said diagram constituent parameter extracting means, the generated diagram constituent fitting in the image data of the connected area.

* * * * *